United States Patent Office 3,405,218
Patented Oct. 8, 1968

3,405,218
EXTRACTING BORDETELLA PERTUSSIS ANTIGENS WITH LITHIUM BROMIDE
Theodore H. Haskell and Stephen Hanessian, Ann Arbor, Mich., assignors to Parke, Davis & Company, Detroit, Mich., a corporation of Michigan
No Drawing. Filed Sept. 22, 1965, Ser. No. 489,396
8 Claims. (Cl. 424—92)

The invention relates to a new and improved process for extracting soluble protective antigen from the organism Bordetella pertussis.

Bordetella pertussis is the causative organism of the childhood disease of whooping cough. It is known that an antigenic substance present in Bordetella pertussis and available in killed-cell vaccines or extracted antigen preparations is capable of protecting or immunizing against this disease.

It is an object of the present invention to provide a process for extracting protective antigen from B. pertussis at a lower pH than is feasible by presently known methods.

Another object of the invention is to provide a process for extracting protective antigen from B. pertussis at a relatively low pH whereby an improved yield of highly purified antigen is obtained having minimum contamination with ribosomal nucleic acids.

A further object of the invention is to provide a process for extracting protective antigen from B. pertussis under conditions whereby the denaturation of protein and the formation of soluble hydrolytic by-products are minimized.

Still a further object of the invention is to provide a process for extracting protective antigen from B. pertussis under conditions whereby a good yield of highly purified antigen is obtained without the necessity for conducting the operations under refrigeration.

These, as well as other objects which will appear hereinafter, are achieved by the new and improved process described below.

It is known in the art to prepare B. pertussis protective antigen by growing B. pertussis in the presence of a nutrient medium, collecting the growth of bacterial cells, and extracting the cells with an extractant solution having cerain well-defined characteristics whereby an antigenic substance is extracted from the bacterial cells into the extractant solution. U.S. Patent 3,141,824 discloses, as an extractant solution, a solution of 0.5 to 1.5 molar sodium chloride which is employed at a temperature between 2 and about 10° C. and at a pH above 8.5 and below 10.5, preferably between about 9.8 and about 10.2. When operating according to the method of U.S. Patent 3,141,824, it is reported that below pH 9.8 the extraction becomes progressively less efficient, and above pH 10.2 the antigen tends to become inactivated.

The present invention provides, in a process for preparing B. pertussis protective antigen by extracting said antigen from cells of B. pertussis with an aqueous solution, the improvement which comprises extracting said cells with an extractant solution of lithium bromide, said extractant solution having a lithium bromide concentration between about 0.75 molar and about 2.25 molar, at a pH above 6.0 and below 8.5, and at a temperature below about 25° C., until a substantial quantity of said antigen has been extracted into said extraction solution; and separating the extractant solution containing antigen from said cells and cellular debris hereof. Thus the specific improvement of the present invention lies in the use of a lithium bromide extractant solution which permits operation at a lower pH and, if desired, at a higher temperature, with accompanying improvements in the yield and quality of the antigen product.

Cells of B. pertussis suitable for use as starting material in the process of the invention can be prepared by any of a variety of methods. For example, an antigenic strain of B. pertussis in phase I is resuspended from the lyophilized state and streaked onto an agar slant. The culture is incubated at 35–37° C. until visible growth appears. This cultivation of B. pertussis is repeated by serial transfer to fresh agar medium contained in larger test tubes or bottles to obtain sufficient culture seed for the production growth flasks. The organisms are then collected from the surface of the agar by scraping or washing with physiological saline solution and the resulting organisms are used to seed production growth flasks. For large-scale growth Roux flasks are used containing a solid nutrient medium, preferably Cohen and Wheeler liquid medium for pertussis to which agar and charcoal have been added. The surface of the medium is flooded or thoroughly streaked with the seed organisms and the flasks incubated at 35–37° C. until confluent growth occurs. The organisms are then harvested either by washing with saline or by scraping and suspending in saline. The harvested suspensions are checked for purity and morphology and then pooled. Essentially all the organisms should be in phase I as indicated by their coccoid-bacilli appearance. The cell concentration is measured in terms of optical density by comparison with an opacity standard provided by the Division of Biologics Standards, National Institutes of Health. The suspension is centrifuged and the clear supernatant or effluent liquid discarded. The wet cell mass is suitable as starting material for the extraction process of the invention. If desired, the cell mass can be stored in the frozen state prior to use.

According to the process of the invention, cells of B. pertussis, as grown above or by any other suitable means, are extracted with an extractant solution of about 0.75 to 2.25 molar lithium bromide, at a pH above 6.0 and below 8.5, and at a temperature below about 25° C. The preferred extractant solution is about 1.0 molar (0.8 to 1.2 molar) lithium bromide at a pH of about 8.0 (7.8 to 8.2). Product of the highest purity is obtained by operating at low temperatures, for example, at about 5 to 10° C. but, if desired, the extraction process can be carried out at temperatures up to about 25° C. without a substantially detrimental effect on the yield and purity of the product, thereby avoiding the necessity for refrigerated manufacturing operations. The extraction is carried out until a susbtantial quantity of the antigen is extracted into the extractant solution, and generally the extraction is carried out until extraction of the antigen is essentially complete. The usual extraction time is at least about one hour and most commonly about 16 to 24 hours. However, when operating at higher temperatures near 25° C., it is preferred to limit the extraction time to a few hours. The ratio of extractant solution to wet cell mass can be varied over relatively wide limits but in general, it is customary to use about 15 to 40 ml. of extractant solution per gram of wet cell mass, a relatively high ratio being used for the less concentrated lithium bromide solutions and a relatively low ratio for the more concentrated lithium bromide solutions. When the extractant solution is 1.0 molar lithium bromide, the preferred ratio is about 33 ml. of extractant solution to 1 g. of wet cell mass.

The extractant solution can, and in most cases does, contain small quantities of dissolved substances in addition to the lithium bromide. A buffering agent such as tris(hydroxymethyl)aminomethane, a borate, or sodium barbital is usually added to maintain a constant pH during the extraction process. It is preferable to incorporate a chelating agent such as ethylenediaminetetraacetic acid, trans-1,2-diaminocyclohexanetetraacetic acid, or a salt of one of the foregoing compounds, as this facilitates processing and results in a product of better quality. It is also desirable to incorporate an antioxidant such as β-mercaptoethanol to prevent or minimize air oxidation of bacterial protein. An acid or base is added as required to adjust the pH.

Following the extraction procedure the extractant solution containing antigen is separated from the bacterial cells and cellular debris by centrifugation or other means suitable to remove the solid materials. The aqueous antigen extract can, if desired, be subjected to further purification operations. For example, the extract is dialyzed against deionized water until the lithium bromide concentration is less than 0.1 molar, preferably 0.02 to 0.04 molar. The pertussis antigen is then precipitated by adjusting the pH to about 4.6–4.8, for example with dilute acetic acid. The solid antigen is collected by centrifugation and it can then be reconstituted in an aqueous medium suitable for parenteral injection. Such a medium is a buffered solution, protected against bacterial contamination and chemical decomposition by the addition of a preservative such as thimerosal. This reconstituted solution is assayed for potency and is then diluted to afford 12 mouse protective units per milliliter or per immunizing dose, the common potency usually used for vaccination. The diluted antigen solution can also be adsorbed on suitable carriers such as aluminum hydroxide or aluminum phosphate to produce an adsorbed antigen. The diluted antigen solution can also be combined with other immunizing agents such as tetanus, diphtheria and poliomyelitis vaccines thus producing polyvalent vaccine products.

The extraction process of the present invention affords various advantages in the extraction of pertussis antigen. The process permits operation in an approximately neutral or slightly alkaline medium, that is at a pH above 6.0 and below 8.5 and thus the extraction is carried out under milder and more nearly physiological conditions. However, successful operation at a pH above 6.0 and below 8.5 is not practical with sodium chloride extractant solution. For example, little or no pertussis antigen is obtained using 1 molar sodium chloride at a pH of 7 to 8. Another advantage of the process of the present invention is that a more highly purified antigen product is obtained. It is found that when employing the process of the invention there is little or no extraction of ribosomal nucleic acids into the antigen extract since they are precipitated by the lithium ion. Moreover, the lower pH minimizes the denaturation of protein, minimizes the formation of soluble hydrolytic by-products, and permits the use of higher temperatures up to about 25° C.

The lithium bromide extractant solution, as described above, can also be used at pH's above 8.5 and below about 10.5, but without achieving all of the advantages of operating in the pH range above 6.0 and below 8.5.

The invention is illustrated by the following example.

Example

An extractant solution is prepared by dissolving 1.2 g. of tris(hydroxymethyl)aminomethane, 105 g. of lithium bromide monohydrate, and 17 mg. of ethylenediaminetetraacetic acid disodium salt in 700 ml. of deionized water, followed by adjusting the pH to 8.0 with dilute hydrochloric acid and diluting the final volume to 1000 ml. with deionized water. This extractant solution is blended in a high speed blender for 15 seconds at 5° C. with 30 g. of *B. pertussis* wet cell mass. With stirring, 10 ml. of 0.1 molar β-mercaptoethanol is added and the mixture is held at 5° C. for 18 hours and then centrifuged in a refrigerated centrifuge at 1500 times gravity for 1 and ½ hours. The supernatant liquid phase is separated, filtered through glass wool, and dialyzed for 18 hours at 5° C., successively against two 6-liter portions of deionized water. The resulting mixture is acidified with 2.0 normal acetic acid to pH 4.6 and the precipitated solid antigen product is collected by centrifugation at 8000 times gravity for 30 minutes at 5° C. This product is homogenized with 200 ml. of 0.02 molar tris(hydroxymethyl)amminomethane. The mixture is adjusted to pH 7.2 with dilute hydrochloric acid and thimerosal is added to a final concentration of 1:0,000. By the standard in vivo assay, this solution is found to contain 420 mouse protective units per milliliter.

The cells of *B. pertussis* required as starting material can be obtained as follows. Eight small test tubes are prepared containing slants of Bordet Gengou agar plus 20% defibrinated normal rabbit blood. Each slant is inoculated with lyophilized *B. pertussis* reconstituted with a small volume of nutrient broth. The cultures are incubated at 35–37° C. for 48 hours and, by means of a sterile platinum wire loop, the organisms are removed and streaked onto 24 large test tubes containing slants by Bordet Gengou agar plus 20% defibrinated normal rabbit blood. These large test tubes are also incubated at 35–37° C. for 48 hours and the organisms are removed as described above and streaked onto the surface of blood agar medium in 24 Roux flasks. The medium used is a liquid medium prepared according to the method of Cohen and Wheeler, American Journal of Public Health, 36, 371–376 (1946) to which has also been added 2.5% agar and 20% defibrinated normal rabbit blood. The Roux flasks are incubated at 35–37° C. for 48 hours. The culture in each flask is examined microscopically for purity and the flasks with satisfactory growth are used as seed culture for the final production flasks. The production flasks are 400 Roux flasks containing the liquid medium of Cohen and Wheeler to which is also added 2.5% agar and 0.4% activated carbon. The production flasks are seeded with *B. pertussis* as grown above and incubated at 35–37° C. for from 48–72 hours. The growth in each flask is examined macroscopically and microscopically (gram stain) for purity and morphology. The satisfactory flasks contain pure coccoid-bacilli or phase I organisms. The growth is scraped from the satisfactory flasks and transferred into sterile bottles, each containing 400 ml. of physiological saline. Each culture harvested in this manner is again checked for purity and the suspensions of organisms are pooled. The cell count is determined by optical density measurement. The organisms are collected by centrifugation at 5 to 10° C. and the liquid phase is discarded. The wet cell mass or cell paste collected by centrifugation contains approximately $1 \times 10^{15}$ organisms per gram as indicated by the optical density measurement showing the total number of organisms present in the harvested and pooled suspension.

We claim:

1. In a process for preparing *Bordetella pertussis* protective antigen by extracting said antigen from cells of *Bordetella pertussis* with an aqueous solution, the improvement which comprises extracting said cells (a) with an extractant solution of lithium bromide, said extractant solution having a lithium bromide concentration between about 0.75 molar and about 2.25 molar, (b) at a pH above 6.0 and below 8.5, and (c) at a temperature below about 25° C., until a substantial quantity of said antigen has been extracted into said extractant solution; and separating the extractant solution containing antigen from said cells and cellular debris thereof.

2. Process according to claim 1 wherein the extractant solution has a lithium bromide concentration of about 1.0 molar and the extraction is carried out at a pH of about 8.0.

3. Process according to claim 1 wherein the quantity of extractant solution is from 15 to 40 milliliters per gram of wet cell mass.

4. Process according to claim 1 wherein (a) the extractant solution containing antigen is thereupon dialyzed until the lithium bromide concentration is reduced to less than 0.1 molar, (b) the antigen is precipitated by acidification to about pH 4.6 to 4.8, and (c) the precipitated antigen is collected and reconstituted in an aqueous medium suitable for parenteral injection.

5. Process according to claim 1 wherein the extractant solution contains as additional dissolved substances a buffering agent, a chelating agent, and an antioxidant.

6. Process according to claim 5 wherein the buffering agent is tris(hydroxymethyl)aminomethane.

7. Process according to claim 5 wherein the chelating agent is ethylenediaminetetraacetic acid or a salt thereof.

8. Process according to claim 5 wherein the antioxidant is β-mercaptoethanol.

No references cited.

RICHARD L. HUFF, *Primary Examiner.*